(12) United States Patent
Zidenberg et al.

(10) Patent No.: US 11,126,474 B1
(45) Date of Patent: Sep. 21, 2021

(54) REDUCING RESOURCE LOCK TIME FOR A VIRTUAL PROCESSING UNIT

(71) Applicant: Amazon Technologies, Inc., Seattle, WA (US)

(72) Inventors: Tzachi Zidenberg, Kfar Hasidim (IL); Adi Habusha, Moshav Alonei Abba (IL); Zeev Zilberman, Tel Aviv (IL)

(73) Assignee: Amazon Technologies, Inc., Seattle, WA (US)

(*) Notice: Subject to any disclaimer, the term of this patent is extended or adjusted under 35 U.S.C. 154(b) by 202 days.

(21) Appl. No.: 15/622,490

(22) Filed: Jun. 14, 2017

(51) Int. Cl.
*G06F 9/52* (2006.01)
*G06F 9/455* (2018.01)
*G06F 9/48* (2006.01)
*G06F 9/50* (2006.01)

(52) U.S. Cl.
CPC .......... *G06F 9/528* (2013.01); *G06F 9/45558* (2013.01); *G06F 9/4881* (2013.01); *G06F 9/5016* (2013.01); *G06F 9/5077* (2013.01); *G06F 9/52* (2013.01); *G06F 9/526* (2013.01); *G06F 9/45533* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 5,345,489 A * | 9/1994 | Saitoh | ..................... | G04F 1/005 377/39 |
| 6,782,440 B2 * | 8/2004 | Miller | ..................... | G06F 8/457 710/200 |
| 6,823,511 B1 * | 11/2004 | McKenney | ............... | G06F 9/52 710/200 |
| 6,880,021 B2 * | 4/2005 | Easton | .................... | G06F 13/24 710/260 |
| 7,035,870 B2 * | 4/2006 | McGuire | ................... | G06F 9/52 707/704 |
| 7,117,481 B1 * | 10/2006 | Agesen | .................... | G06F 9/526 717/120 |
| 7,346,720 B2 * | 3/2008 | Fachan | ................... | G06F 9/526 710/200 |

(Continued)

OTHER PUBLICATIONS

K. Chakraborty, P. M. Wells and G. S. Sohi, "Supporting Overcommitted Virtual Machines through Hardware Spin Detection," in IEEE Transactions on Parallel and Distributed Systems, vol. 23, No. 2, pp. 353-366, Feb. 2012, doi: 10.1109/TPDS.2011.143. (Year: 2012).*

(Continued)

*Primary Examiner* — Abu Zar Ghaffari
(74) *Attorney, Agent, or Firm* — Weaver Austin Villeneuve & Sampson LLP

(57) ABSTRACT

Techniques for reducing the probability of spinlock and/or reducing the time that a virtual central processing unit (CPU) may hold a lock are provided. In one embodiment, a computer-implemented method includes determining that an executing virtual CPU is holding a lock for exclusive use of a resource, and scheduling the executing virtual CPU to run for up to a specified time period before de-scheduling the executing virtual CPU. In one embodiment, the executing virtual CPU holding the lock writes a value to a register to indicate that the executing virtual CPU is holding the lock.

20 Claims, 8 Drawing Sheets

(56) References Cited

U.S. PATENT DOCUMENTS

| | | | |
|---|---|---|---|
| 7,428,732 B2* | 9/2008 | Sandri | G06F 9/52 |
| | | | 710/200 |
| 7,765,543 B1* | 7/2010 | Weissman | G06F 9/485 |
| | | | 714/48 |
| 8,713,563 B2* | 4/2014 | Kondoh | G06F 9/5077 |
| | | | 718/1 |
| 8,751,715 B1* | 6/2014 | Shubel | G06F 13/372 |
| | | | 710/110 |
| 9,274,823 B1* | 3/2016 | Koryakin | G06F 9/45558 |
| 9,411,630 B1* | 8/2016 | Adams | G06F 9/45533 |
| 9,582,295 B2* | 2/2017 | Gainey, Jr. | G06F 9/4403 |
| 9,965,412 B2* | 5/2018 | Liu | G06F 13/24 |
| 10,002,161 B2* | 6/2018 | Balko | G06F 16/24565 |
| 10,169,107 B2* | 1/2019 | Greco | G06F 9/48 |
| 10,387,332 B1* | 8/2019 | Metcalf | G06F 13/4282 |
| 10,423,451 B2* | 9/2019 | Fahrig | G06F 9/5022 |
| 10,521,357 B1* | 12/2019 | Ramey | G06F 12/1009 |
| 2002/0046334 A1* | 4/2002 | Wah Chan | G06F 9/30021 |
| | | | 712/223 |
| 2004/0230972 A1 | 11/2004 | Donovan et al. | |
| 2006/0075061 A1* | 4/2006 | Garcia | G06F 9/526 |
| | | | 709/213 |
| 2006/0130062 A1* | 6/2006 | Burdick | G06F 9/4881 |
| | | | 718/100 |
| 2007/0050567 A1* | 3/2007 | Murakami | G06F 9/3004 |
| | | | 711/150 |
| 2008/0184249 A1* | 7/2008 | Adams | G06F 9/526 |
| | | | 718/104 |
| 2008/0250422 A1 | 10/2008 | Lewis | |
| 2009/0025006 A1* | 1/2009 | Waldspurger | G06F 9/5016 |
| | | | 718/104 |
| 2009/0049220 A1* | 2/2009 | Conti | G06F 13/24 |
| | | | 710/267 |
| 2009/0157936 A1* | 6/2009 | Goss | G06F 9/4812 |
| | | | 710/264 |
| 2009/0177932 A1* | 7/2009 | Abts | G06F 11/106 |
| | | | 714/704 |
| 2010/0011360 A1* | 1/2010 | Fontenot | G06F 9/526 |
| | | | 718/100 |
| 2010/0031254 A1* | 2/2010 | Chin | G06F 9/45533 |
| | | | 718/1 |
| 2011/0087815 A1* | 4/2011 | Kruglick | G06F 13/24 |
| | | | 710/260 |
| 2011/0099551 A1* | 4/2011 | Fahrig | G06F 9/5038 |
| | | | 718/102 |
| 2011/0119667 A1* | 5/2011 | Srinivasan | G06F 11/301 |
| | | | 718/1 |
| 2011/0213992 A1 | 9/2011 | Satsangi et al. | |
| 2012/0047220 A1* | 2/2012 | Usui | G06F 15/17325 |
| | | | 709/213 |
| 2013/0290585 A1* | 10/2013 | Marietta | G06F 13/14 |
| | | | 710/240 |
| 2014/0059333 A1* | 2/2014 | Dixon | G06F 9/30098 |
| | | | 712/244 |
| 2014/0149979 A1 | 5/2014 | Tsirkin et al. | |
| 2015/0033228 A1* | 1/2015 | Lee | G06F 9/45533 |
| | | | 718/1 |
| 2015/0121377 A1* | 4/2015 | Zang | G06F 9/45558 |
| | | | 718/1 |
| 2016/0057165 A1 | 2/2016 | Thakar et al. | |
| 2016/0092320 A1* | 3/2016 | Baca | G06F 11/1641 |
| | | | 714/49 |
| 2016/0359638 A1 | 12/2016 | Shi et al. | |
| 2017/0286278 A1* | 10/2017 | Thomas | G06F 8/70 |
| 2018/0032588 A1 | 2/2018 | Nor et al. | |
| 2018/0060103 A1* | 3/2018 | Tsirkin | G06F 9/45558 |
| 2018/0173580 A1* | 6/2018 | Pavlas | G06F 11/1441 |

OTHER PUBLICATIONS

U.S. Appl. No. 15/719,352, entitled "Wait Optimization," filed Sep. 28, 2017.

Theurer, Andrew. KVM and Big VMs. KVM Forum 2012 [online] Linux-KVM, 2012 [retrieved on Jun. 19, 2017]. Retrieved from the Internet: <URL: linux-kvm.org/images/5/55/2012-forum-Andrew_Theurer-Big-SMP-VMs.pdf>.

* cited by examiner

US 11,126,474 B1

REDUCING RESOURCE LOCK TIME FOR A VIRTUAL PROCESSING UNIT

BACKGROUND

In a virtualized computer system, a lock may be used to ensure that only one virtual CPU can access a critical resource, such as a memory, at a time. A spinlock in the virtualized computer system is a lock that causes a virtual CPU trying to acquire it to wait in a loop ("spin") while repeatedly checking if the lock is available. In a non-virtualized system, a spinlock may generally be resolved quickly because the lock can generally be released after a short time period. However, a virtualized computing system can suffer severe performance degradation as a result of spinlock operations because a virtual CPU that holds a lock may be de-scheduled from execution for a long period of time.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In a computer system, one or more processors may run concurrently. A lock may be used to prevent simultaneous access to a critical hardware or software resource (e.g., memory, CPU, file, data, table, etc.) by more than one processor. One processor may acquire and hold the lock until it releases the lock. Before the lock is released, another processor attempting to acquire the same lock may need to wait and repeatedly try to acquire the lock in a loop. This looping may waste the CPU time that can otherwise be used for other tasks. In a virtualized system, the performance of the system may be significantly reduced because a virtual CPU (VCPU) on a virtual machine (VM) that holds a lock may be de-scheduled from running for a long period of time in certain situations.

Disclosed herein are techniques for improving the performance of a virtualized system by reducing the probability of spinlock and/or reducing the time that a VCPU holds the lock. More specifically, instead of detecting the VCPUs that are spinning or waiting for a lock and removing these VCPUs from execution, a lock-holding VCPU may inform the hypervisor that it is holding a lock, and, when the lock-holding VCPU is to be de-scheduled, the hypervisor may give the lock-holding VCPU a small number of extra cycles to finish executing a critical section of a computer program, freeing resources, and/or releasing the lock. As used herein, a critical section may be referred to as a code segment that accesses a shared resource, such as a variable, a data structure, a peripheral device, a network connection, etc.

Generally speaking, virtualization is the creation of one or more logical systems from a single physical system. A virtualized system allows time-sharing among multiple guest operating systems on isolated virtual machines in a physical hardware system, where applications running on a given guest environment (virtual machine) may view the virtual machine as a stand-alone system.

Figure 1:
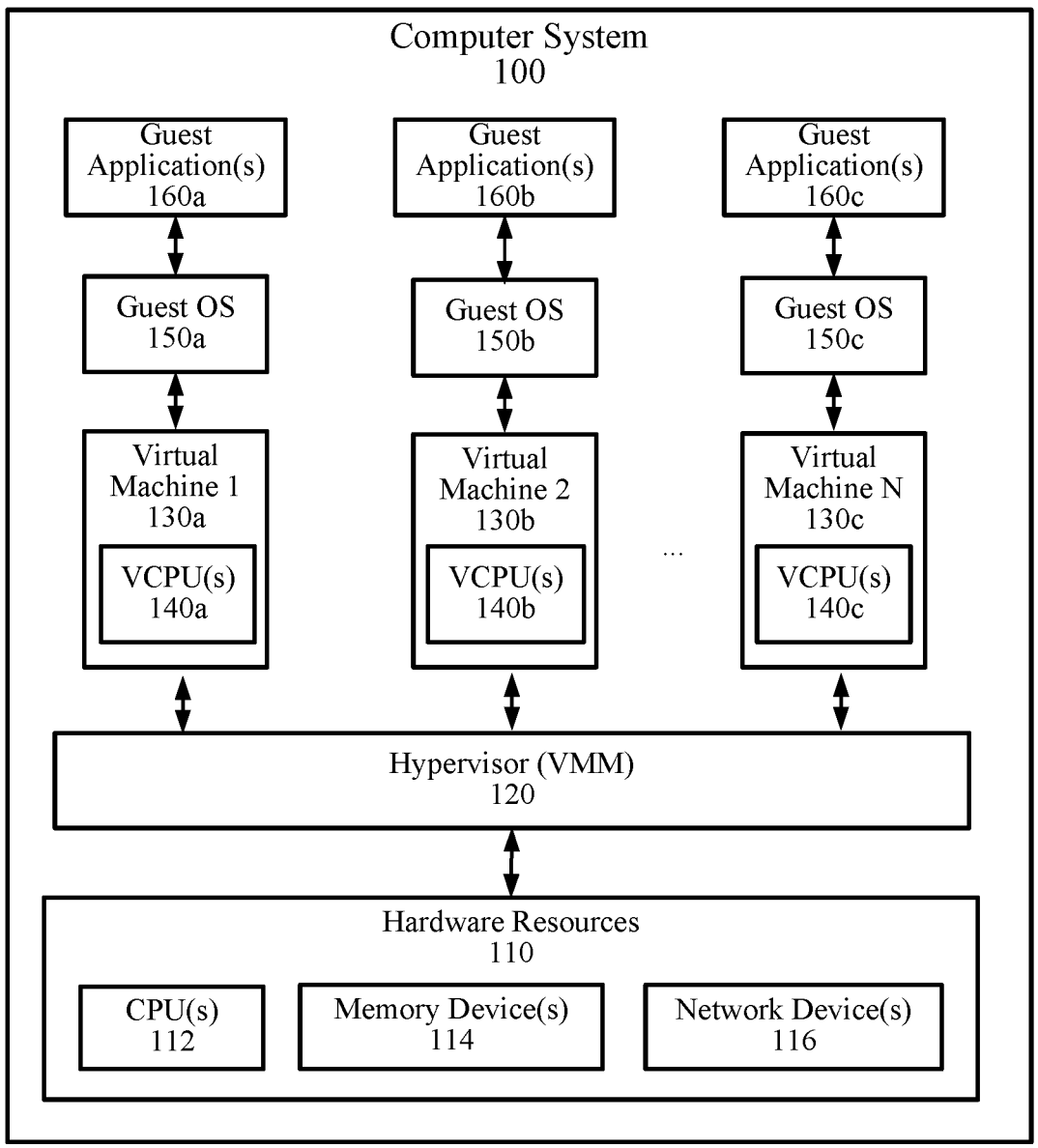
FIG. 1 is a simplified block diagram of an example virtualized computer system, according to certain aspects of the present disclosure.

FIG. 1 is a simplified block diagram of an example virtualized computer system 100, according to certain aspects of this disclosure. Computer system 100 may include hardware resources 110 that may include one or more CPUs 112, one or more memory devices 114, one or more network devices 116, or any suitable components. A hypervisor 120 may execute on hardware resources 110 (e.g., through a host operating system) to manage a plurality of virtual machines on computer system 100, such as VM 1 (130a), VM 2 (130b), . . . , and VM N (130c), where N is at least one and may be up to, for example, 10 or more, 20 or more, or 100 or more.

Hypervisor 120, also referred to as a virtual machine manager (VMM), can emulate multiple virtual devices on a single physical device in a virtualized environment. Hypervisor 120 can also manage the flow of information between software, the virtualized hardware, and the physical hardware. Hypervisor 120 may be configured to create, start, monitor, stop, or delete each of VMs 1-N (130a-130c), and may execute at a higher privilege level than VMs 1-N (130a-130c). In some implementations, hypervisor 120 can manage access controls, resources, scheduling, isolation, etc., for VMs 1-N (130a-130c) that execute their respective guest operating systems. Hypervisor 120 may be implemented as a software layer or as code embedded in a firmware on computer system 100. Hypervisor 120 may be a type-2 hypervisor (e.g., hosted hypervisor) or a type-1 hypervisor (e.g., bare-metal hypervisor), or any other suitable implementation.

Each of VMs 1-N (130a-130c) may be any suitable emulation of a computer system that may be managed by hypervisor 120. Each of VMs 1-N (130a-130c) can run one or more independent operating systems and one or more applications or processes on hardware resources 110. Two or more VMs from VMs 1-N (130a-130c) may execute simultaneously or in any order on computer system 100. For example, in some instances, at a given time, VMs 1-N (130a-130c) may execute simultaneously on computer system 100. In some instances, VMs 1-N (130a-130c) may execute on computer system 100 one at a time. For example, hypervisor 120 may create and start VM 1 (130a) for a first user. After the user finishes running applications or processes on VM 1 (130a), hypervisor 120 may stop and delete VM 1 (130a), and create and start VM 2 (130b) for a second user, and so on.

Each of VMs 1-N (130a-130c) may be assigned one or more virtual CPUs (VCPUs) 140a, 140b, or 140c. VCPUs are mapped to allocated time slices of available logical processors in the physical computer and can be scheduled by the hypervisor to allow more virtual processors than available logical processors. One or more guest operating systems 150a, 150b, . . . , or 150c may run on the one or more VCPUs 140a, 140b, . . . , or 140c in VM 1 (130a), VM 2 (130b), . . . , or VM N (130c), respectively. One or more guest applications 160a, 160b, . . . , or 160c may in turn run on and managed by the corresponding guest operating systems.

In a computer system, if a number of processors simultaneously attempt to access a critical resource, such as update a same memory location, each processor will wait for its turn. A lock may be used to provide mutual exclusion and enforce atomic operations, and atomic instructions may be used to arbitrate between simultaneous attempts to acquire the lock. Once a processor acquires the lock, the lock may generally be held by the processor until the lock is explicitly released. When the lock is being held by a processor, another processor attempting to acquire the lock may repeatedly try to acquire the lock in a tight loop called a spinlock, and the activity or retrying is known as "spinning," which refers to the operation of repeatedly checking the lock to see if it is available. Because the spinning processor remains active but is not performing a useful task, the use of such a lock is a "busy waiting" and may waste CPU time. However, using spinlocks may avoid overhead from rescheduling or context switching by the operating system, and thus may be efficient if the processor only holds the lock for a short period of time.

A spinlock may be a mutual exclusion device that has only two values: "locked" and "unlocked." It may be implemented as a single bit or a multiple bit integer value. A processor attempting to acquire a particular lock may test the relevant bit. If the lock is available, the "locked" bit may be set by the processor and the processor may continue into a critical section of a computer program. If, instead, the "locked" bit has already been set and the lock has been taken by another processor, the processor attempting to acquire the lock may go into a tight loop where it repeatedly checks the lock until it becomes available. The test and set operation may generally be done in an atomic manner so that only one processor can obtain the lock, even if several are spinning at any given time.

Figure 2:
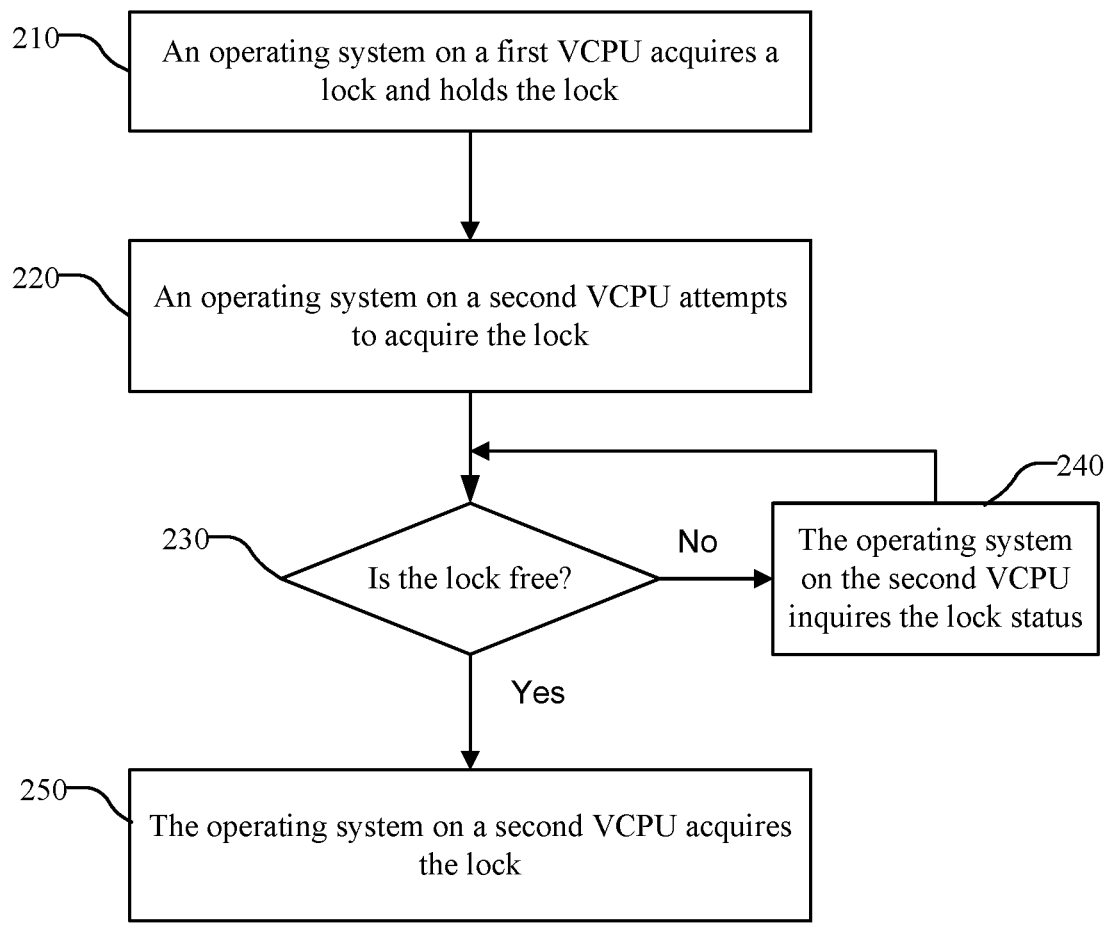
FIG. 2 is a simplified flow chart illustrating an example spinlock operation in a virtualized computer system.

FIG. 2 is a simplified flow chart illustrating an example spinlock operation in a virtualized system, such as computer system 100. At block 210, prior to accessing a critical resource, an operating system (i.e., a guest operating system) running on a VCPU may attempt to acquire a lock because multiple VCPUs on a same virtual machine may request access to a same critical resource. The operating system on the first VCPU may read a lock state stored in a lock register to determine whether another VCPU is accessing the critical resource. If the lock is in a free state when the first (lock-requesting) VCPU reads the state of the lock, i.e., no other lock requester is attempting to access the critical resource, the first VCPU may acquire the lock. After the first VCPU acquires the lock, the first VCPU may set the lock to a held state to indicate to other lock-requesting VCPUs that the critical resource is being accessed. The first VCPU may hold the lock while it is accessing the critical resource.

At block 220, an operating system on a second VCPU of the virtual machine may attempt to acquire the same lock in order to access the critical resource. The second VCPU may read the lock state stored in the lock register to determine whether another VCPU is currently accessing the critical resource as described above.

At block 230, the second VCPU may determine if the lock is free based on the read value from the lock register. If the lock is in a held state and has not been released by the first VCPU yet when the second VCPU reads the state of the lock in the lock register, i.e., the first VCPU is currently accessing the critical resource, the second VCPU may proceed to block 240. If the first VCPU has released the lock and/or has changed the lock status in the lock register to the free state, the second VCPU may proceed to block 250.

At block 240, the second VCPU may keep reading the lock register and determining whether the lock is released at block 230. The second VCPU may repeat operations in blocks 240 and 230 until the lock becomes free, at which point the second VCPU may proceed to block 250.

At block 250, the second VCPU may acquire the lock. After the second VCPU acquires the lock, the second VCPU may set the lock to a held state to indicate to other lock-requesting VCPUs that the critical resource is being accessed. The second VCPU may then hold the lock while it is accessing the critical resource.

FIG. 2 only illustrates one VCPU that is trying to acquire the lock at a given time. However, multiple VCPUs may try to access the critical resource at a given time. Thus, the multiple VCPUs may race to acquire the lock. Once one VCPU acquires the lock, other VCPUs may need to wait and spin until the lock is free again, at which time the VCPUs may race to acquire the lock again.

Spinlocks may become a major cause of overheads if the lock is being held by a VCPU for a long period of time because the longer a VCPU holds a lock, the greater the risk that the VCPU may be interrupted by the operating system scheduler (i.e., the hypervisor) while the VCPU holds the lock. When a VCPU that holds the lock is interrupted or rescheduled, it may not make any progress towards releasing the lock. Other VCPUs trying to acquire the lock may be left spinning indefinitely and waste their quantum (allocated share of time) until the VCPU that holds the lock reruns and releases the lock.

The use of spinlocks is based on the assumption that spinlocks are generally held for a short period of time, which may not be guaranteed in virtualized systems. In a virtualized system, a VM may have multiple VCPUs, which may share physical CPUs with VCPUs from other VMs. Typically the total number of VCPUs across all VMs exceeds the number of physical CPUs. In some cases, such as cloud environments, there may be several times as many VCPUs as physical CPUs. To accomplish this, a hypervisor scheduler may give time slices of physical processor time to the VCPUs, similar to the way that an operating system schedules processes. If the virtualized system has more VCPUs attempting to run than the physical processors available to run them, some of the VCPUs may be preempted to let others run. Thus, virtualized systems, especially ones with CPU oversubscription, may schedule virtual CPUs in and out of execution. This allows the VCPUs to share the physical CPU resources effectively, but it breaks the assumption in the spinlock technique that a VCPU is not preempted while holding a spinlock. Thus, in a virtualized system, a lock-holder preemption may occur when a lock-holding virtual CPU running on a virtual machine is not scheduled by the hypervisor to run, while other VCPUs trying to acquire the same lock will be stuck in a loop waiting for the lock to be released, which may not happen until the lock-holding VCPU is scheduled back to run.

For example, VCPU A may acquire a lock, but may be preempted by the scheduler before it finishes. While VCPU A holds the lock, VCPU B may try to acquire the lock. As such, VCPU B, instead of spinning for a short period of time that VCPU A needs the spinlock for, may be spinning until VCPU A is rescheduled to run again, which may be anywhere from several milliseconds to hundreds of milliseconds, depending on how busy the system is. VCPU B is using the CPU but does not accomplish its intended task. Thus, VCPU B may use its VM's share of CPU time, and keep other VCPUs with useful work to do from running. In some cases, the reason why VCPU A is not running may be because the hypervisor's scheduler is trying to give priority to VCPU B. In other words, VCPU B may be actively keeping VCPU A from finishing the work that it needs to do with the spinlock and releasing the exact spinlock that VCPU B is waiting for.

One way to avoid lock-holder preemption in order to reduce the waste of CPU time is to detect the VCPUs that have been spinning or waiting for a lock for a certain period of time, and remove them from execution to save the CPU cycles that may otherwise be wasted for other tasks. Examples of such techniques include Pause-Loop Exiting (PLE) in Intel® processors, Pause Filtering (PF) in AMD® processors, or Wait-For Event (WFE) to wait for lock release in ARM® processors. For example, in Intel x86 processors, a physical hardware device (e.g., a CPU) may monitor the execution within a VCPU on a VM. When an excessive number of iterations around a spinlock are detected (e.g., signaled by the occurrence of many executions of "Pause" instructions), the physical hardware device (e.g., the CPU) may cause the VCPU to exit and return the control to the hypervisor so that the hypervisor can schedule another VCPU to run. Hardware detection of spinlocks may need hardware that can support PLE or PF, and may not work well for a large number of VCPUs in a VM due to more candidate VCPUs to yield to and more chances of lock contention. In some cases, the hardware may detect spin too aggressively such that it may cause a VCPU to exit even if there is no lock-holder preemption.

Another option to avoid the lock-holder preemption is using paravirtualized spinlocks. Paravirtualization is an enhancement of virtualization technology in which a guest operating system (OS) is recompiled prior to installation on a virtual machine. The guest OS may be aware that it operates in a shared medium at some level. This capacity may minimize overheads and optimize system performance by supporting the use of virtual machines that would otherwise be underutilized in conventional or full virtualization. The guest OS can give hints to the hypervisor how long a lock is held by a VCPU and the hypervisor may not preempt this VCPU for a specified time. One limitation of paravirtualization is that the guest OS must be tailored specifically to run on top of the hypervisor. Thus, paravirtualization depends on the underlying virtualization platform and may not be implemented in a platform independently. Furthermore, paravirtualization may create more VCPU exits and may potentially reduce overall system performance.

Disclosed herein are techniques for improving the overall performance of a virtualized system by reducing the probability of spinlock and/or reducing the time that a VCPU may hold the lock. More specifically, instead of detecting the VCPUs that are spinning or waiting for a lock and removing these VCPUs from execution, a lock-holding VCPU may write a value (i.e., lock tag) to a HOLD_LOCK register when it acquires a lock, and clear the lock tag in the HOLD_LOCK register when it releases the lock. The hypervisor may determine whether a currently running VCPU is holding a lock based on the status of the HOLD_LOCK register, when deciding to de-schedule the currently running VCPU. When the lock-holding VCPU that is currently running is to be de-scheduled, the hypervisor may give the lock-holding VCPU a number of extra clock cycles to finish executing a critical section of a computer program, freeing resources, and releasing the lock. In some embodiments, additional hardware registers and circuits may be used to allow a currently running VCPU that holds a lock to run for a certain time period, and call the hypervisor after the certain time period to de-schedule the currently running VCPU.

Figure 3:
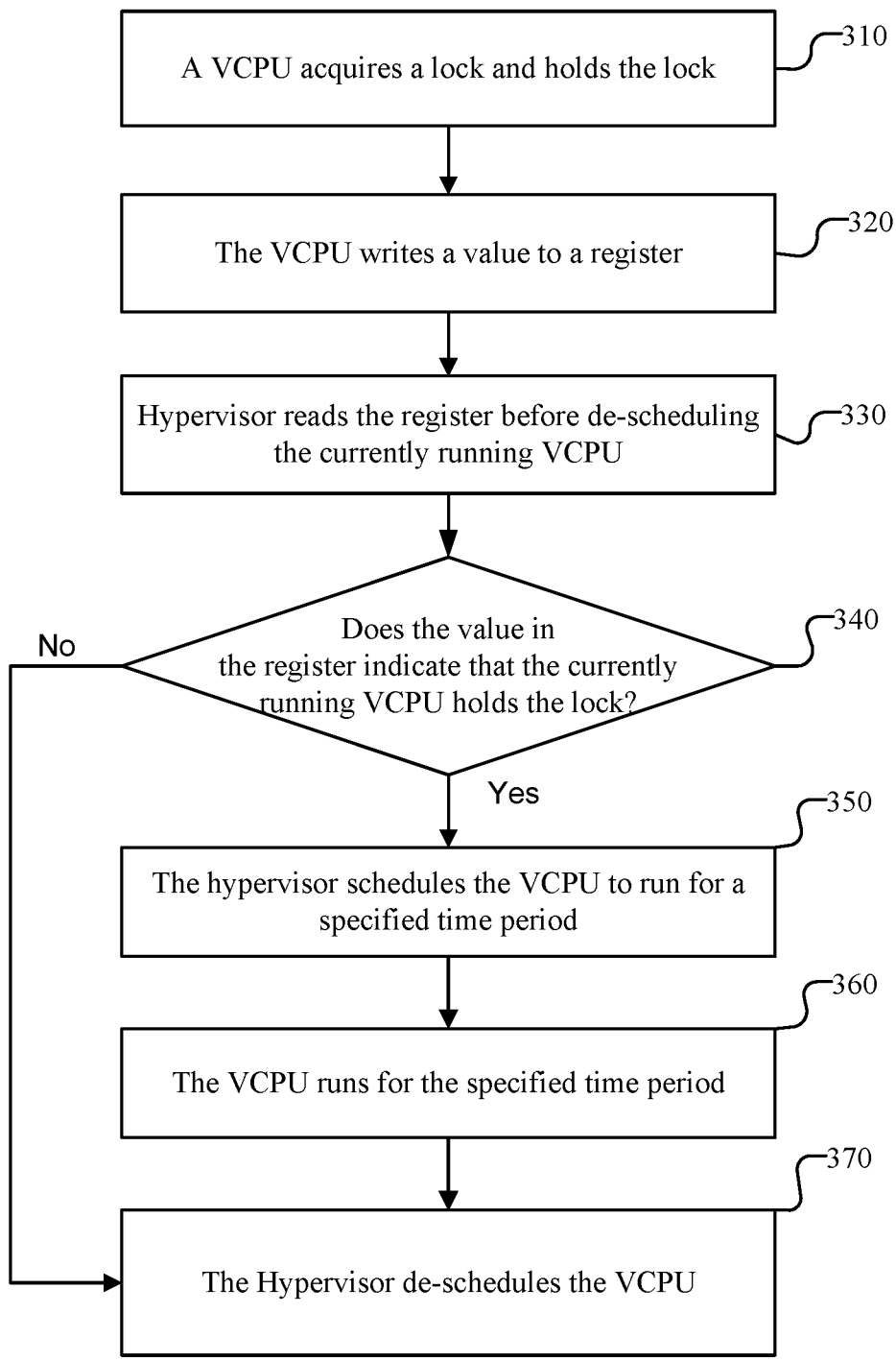
FIG. 3 is a simplified flow chart illustrating an example method of handling spinlocks in a virtualized computer system, according to certain aspects of the present disclosure.

FIG. 3 is a simplified flow chart 300 illustrating an example method of handling spinlocks in a virtualized computer system, according to certain aspects of the present disclosure. The method may be implemented by the systems described above, such as, for example, with respect to FIG. 1. A register (e.g., a HOLD_LOCK register) that can be set or cleared by a VCPU may be used to indicate whether the VCPU is holding a lock, and a hypervisor may schedule VCPUs based on the status of the lock. The register can be a single bit register or a register having any number of bits, such as 16 or 64. In certain implementations, the value in the register may be initialized to zero, which may indicate that the currently running VCPU is not holding a lock. A non-zero value in the register may indicate that a lock is being held by a currently running VCPU. In some other implementations, a value other than zero in the register may indicate that the currently running VCPU is not holding a lock.

At block 310, a VCPU may try to acquire a lock in order to execute a critical section of a computer program using a critical resource, such as a table, a file, etc. As described above, prior to executing the critical section using the critical resource, the VCPU may attempt to acquire a lock because multiple VCPUs on a same virtual machine may request access to the critical resource. As also described above, the VCPU may attempt to acquire the lock using atomic instructions. The VCPU may read a lock status in a register (which may not be the same as the HOLD_LOCK register) to determine whether the critical resource is being used. If the lock is free when the VCPU reads the register, i.e., no other VCPU is accessing the critical resource, the VCPU may acquire the lock and hold the lock while executing the critical section.

At block 320, the VCPU may write a value (i.e., a lock tag, e.g., a non-zero value, such as a "1") to the HOLD_LOCK register to indicate that a lock is being held by the VCPU. In some implementations, the VCPU may write the non-zero value to the register after it has acquired a lock. In such cases, there may be a short period of time after the VCPU acquires the lock but before the VCPU writes the non-zero value to the HOLD_LOCK register, during which other VCPUs or the hypervisor may mistakenly believe that the VCPU is not holding a lock. In some implementations, the VCPU may write the non-zero value to the HOLD_LOCK register when it is about to acquire a lock but before it actually acquires the lock, and may write a "0" to the HOLD_LOCK register later if it fails to acquire the lock. In such case, the VCPU may prematurely indicate that it holds the lock before it actually acquires the lock. This may reduce possible racing conditions that may occur if the VCPU writes the lock tag to the HOLD_LOCK register after it has actually acquired the lock. In some embodiments, if the HOLD_LOCK register is written just before an exclusive/atomic instruction (e.g., to acquire a lock), and the exclusive/atomic instruction fails, the register may optionally be automatically cleared by a hardware. In some embodiments, the VCPU may write a non-zero value (i.e., lock tag) that indicates that the VCPU is holding a lock with a particular tag (e.g., address). If, at any time while holding the lock, the VCPU finishes the critical section, it may release the lock and write a zero back to the HOLD_LOCK register.

At block 330, a hypervisor may decide to de-schedule the VCPU that is currently running so that other VCPUs may, for example, get the CPU time to execute guest applications. Before de-scheduling the currently running VCPU, the hypervisor may read the HOLD_LOCK register to determine whether the currently running VCPU is holding a lock.

At block 340, the hypervisor may determine whether the currently running VCPU is holding a lock by determining whether the value in the HOLD_LOCK register is, for example, zero. If the value in the HOLD_LOCK register is zero, the currently running VCPU is not holding a lock. Therefore, the VCPU can be safely interrupted or de-scheduled without causing the lock-holder preemption. In such cases, the hypervisor may proceed to block 370 to de-schedule the currently running VCPU. If the value in the HOLD_LOCK register is a non-zero value, the currently running VCPU may still hold a lock, and thus, if the currently running VCPU is being interrupted or de-scheduled at the moment, there may be a risk of lock-holder preemption. In such case, the hypervisor may proceed to block 350 before de-scheduling the VCPU.

At block 350, the hypervisor may allow the currently running VCPU to continue to run for an extra time period (e.g., 1 mS, 10 mS, or 30 mS, etc.) or a number of clock cycles (e.g., 100 cycles or less, 1000 cycles or less, or 10000 cycles or less) to finish the critical section and free the resource. In some implementations, the hypervisor may allow the VCPU to run for a full duration of a time slice. In some implementations, the hardware of the virtualized system may allow the VCPU to run for the extra time period, and then call the hypervisor to de-schedule the VCPU after the extra time period expires.

At block 360, the currently running VCPU may run for the specified extra time period. The currently running VCPU is assumed to be able to finish the critical section within the allocated extra time period or extra number of clock cycles while holding the lock, which is the general assumption for the spinlock mechanism. In some cases, the currently running VCPU may be able to finish the critical section within the extra time period and release the lock. In some cases, however, the currently running VCPU may not be able to finish the critical section within the extra time period and may still hold the lock after the extra time period. In any case, the hypervisor may proceed to block 370 after the specified extra time period.

At block 370, the hypervisor may de-schedule the currently running VCPU and schedule another VCPU to run. In some embodiments, whenever the hypervisor de-schedules the currently running VCPU, switches VCPUs, or enables a new VCPU, the HOLD_LOCK register may be cleared if it has not been cleared by the previously running VCPU or the hardware of the virtualized system.

Even though FIG. 3 describes an example method as sequential operations, some of the operations may be performed in parallel or concurrently. Some of the operations may be performed in different order. For example, operations in blocks 310 and 320 may be performed in different orders. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

In various implementations, additional features, such as additional registers, circuits, or mechanisms may be used to further improve the effectiveness of spinlock handling and hence the overall performance of a virtualized system.

For example, in some implementations, a WAIT_LOCK register may be used. The WAIT_LOCK register may include any number of bits, such as 1 bit, 16 bits, or 64 bits. A VCPU may write a non-zero value (e.g., a lock tag, such as "1") to the WAIT_LOCK register before executing the WFE instruction to wait for a spinlock, and may write a zero to the WAIT_LOCK register after it acquires the lock. When a lock tag is written in the WAIT_LOCK register, the lock tag may signal to the hypervisor that a VCPU is spinning on a lock with this particular tag (address). In some embodiments, when a VCPU waiting for the lock acquires the lock and writes a lock tag to the HOLD_LOCK register, it may automatically clear (write "0" to) the WAIT_LOCK register.

As described above, when a hypervisor attempts to de-schedule a currently running VCPU, it may read the HOLD_LOCK register. If the value of the HOLD_LOCK register is, for example, zero, the hypervisor may de-schedule the running VCPU as planned. If the value of the HOLD_LOCK register is, for example, a non-zero value, the hypervisor may choose to allow the VCPU to run either another full time slot or a specified time period.

In some embodiments, the hypervisor may perform additional measures to make sure that no misusing of the techniques described above is occurring. For example, in some implementations, a HOLD_LOCK_TRIGGER register may be used and may be configured by the hypervisor. When the HOLD_LOCK_TRIGGER register is set, a trigger circuit may be enabled, and the hypervisor may allow the currently running VCPU that holds the lock to run for an extra time period or until the VCPU releases the lock before the extra time period expires. Once the VCPU releases the lock and clears the HOLD_LOCK register by writing, for example, a zero to the HOLD_LOCK register, a hypervisor level exception (interruption) may be triggered by the trigger circuit immediately and caught by the hypervisor, such that the hypervisor may de-schedule the VCPU right after the VCPU releases the lock. In such implementations, the hypervisor may allow the VCPU to run a larger number of cycles before the VCPU releases the lock, but once the lock is released, the VCPU is de-scheduled from execution.

In some implementations, a timer circuit and a HOLD_LOCK_TIMER register may be used for limiting the time that a VCPU that holds a lock may get to run by indicating that it is holding a lock. For example, the hypervisor may configure the HOLD_LOCK_TIMER register to enable the timer circuit. The timer circuit, when enabled, may start a timer to count down from a specified value when a non-zero value (e.g., a log-tag) is written to the HOLD_LOCK register. When the HOLD_LOCK register is cleared, for example, after the lock-holding VCPU releases the lock and clears the HOLD_LOCK register, the timer may be reset, for example, to zero or the specified value. When the timer is counting, any further non-zero write to the HOLD_LOCK register may be ignored and/or the timer value may not be increased back to the specified value, and the VCPU can continue to hold the lock and run. When the timer counts to zero, the HOLD_LOCK register may be cleared, for example, by the timer circuit, which may trigger the hypervisor to de-schedule the currently running VCPU, as described above. In this way, the VCPU holding the lock may not run for a time period longer than it is allowed to while holding the lock.

In some implementations, a HOLD_LOCK_MASK register may be used, which, when set or enabled, may enable an interrupt mask circuit to mask some or all hypervisor interrupts during the time when the value in the HOLD_LOCK register is not zero (or is not any other specified value indicating that the currently running VCPU is not holding the lock). The masked hypervisor interrupts occurred during the time when the value in the HOLD_LOCK register is not zero may be performed after the HOLD_LOCK register is cleared, for example, after the VCPU that previously held the lock releases the lock or after the timer counts to zero, as described above.

In this way, a VCPU that holds a lock may not be interrupted or de-scheduled before the lock is released by the VCPU or before the timer expires. Further, the VCPU may not run for too long while holding the lock, and may be de-scheduled after a given time period, and thus other VCPUs may not wait for too long.

In some embodiments, some or all of the additional features described above may be implemented using the VCPU or the hypervisor. In some embodiments, at least some of the additional features described above may be implemented using one or more hardware circuits. For example, in some implementations, a trigger signal may be automatically generated by a circuit when a zero is written in the HOLD_LOCK register, which may trigger a call of the hypervisor to de-schedule the currently running VCPU. In some embodiments, some or all of the functions described above may be implemented in hardware, software, firmware, middleware, microcode, hardware description languages, or any combination thereof.

Figure 4:
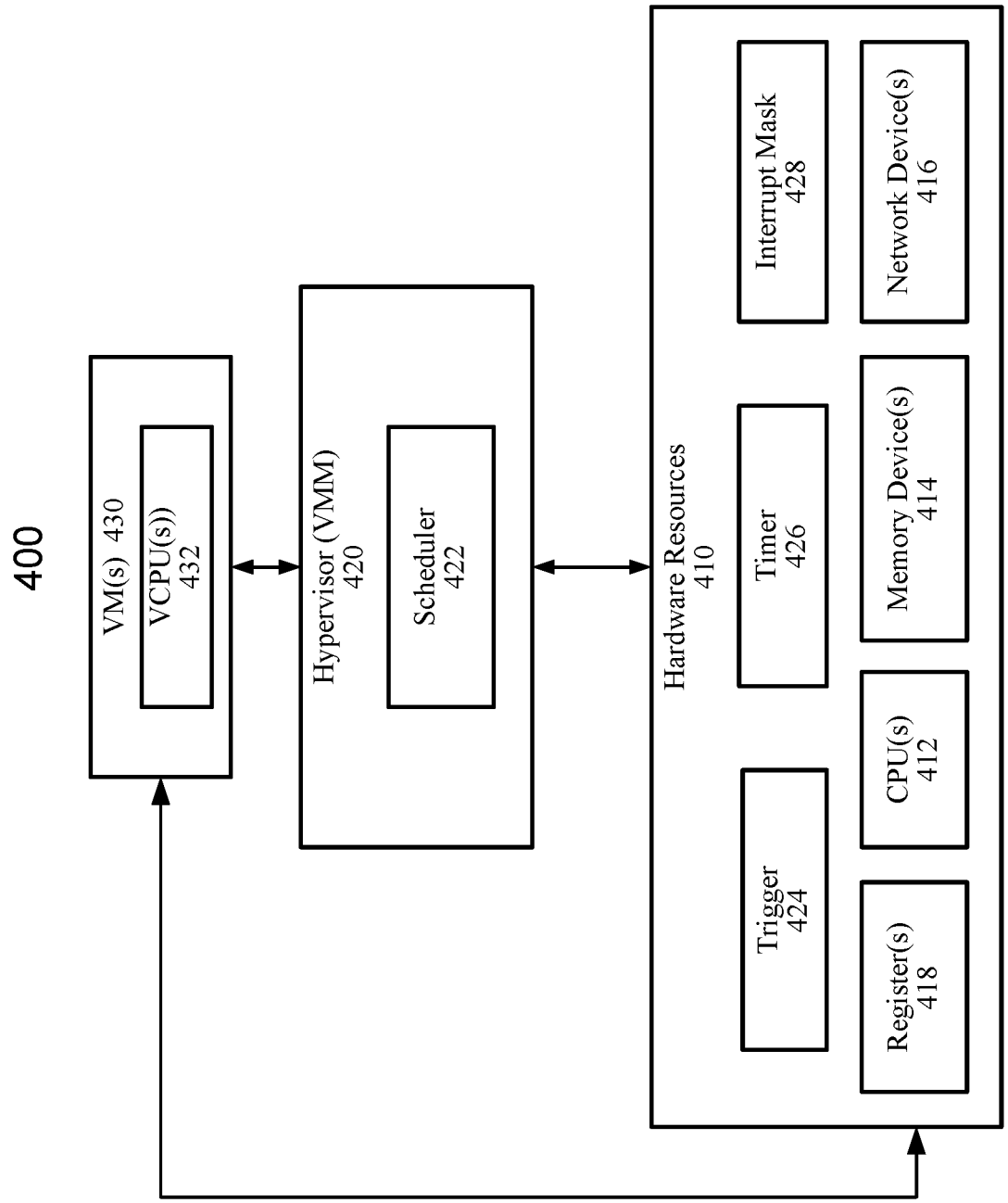
FIG. 4 is a simplified block diagram of an example virtualized computer system, according to certain aspects of the present disclosure.

FIG. 4 is a simplified block diagram of an example virtualized computer system 400 for implementing some of the features described above, according to certain aspects of this disclosure. Computer system 400 may include hardware resources 410 that may include one or more CPUs 412, one or more memory devices 414, one or more network devices 416, one or more registers 418, a trigger circuit 424, a timer circuit 426, an interrupt mask circuit 428, or any suitable components as described above. Register(s) 418 may include one or more of the registers described above, such as a HOLD_LOCK register, a WAIT_LOCK register, a HOLD_LOCK_TRIGGER register, a HOLD_LOCK_TIMER register, or a HOLD_LOCK_MASK register. In some embodiments, some or all of the registers described above may be implemented in memory device(s) 414.

A hypervisor 420 may execute on hardware resources 410 (e.g., bare-metal or through a host operating system) to manage one or more virtual machines, such as VM(s) 430, on computer system 400. Each of VM(s) 430 may be assigned one or more VCPUs 432. VM(s) 430 and/or VCPU(s) 432 may write to or read from register(s) 418. For example, VM(s) 430 and/or VCPU(s) 432 may write information associated with a lock (e.g., a lock tag) to the HOLD_LOCK register or the WAIT_LOCK register as described above. VM(s) 430 and/or VCPU(s) 432 may also read information associated with a lock from register(s) 418, for example, in order to acquire a lock.

Hypervisor 420 may include a scheduler 422 for determining which VCPU from VCPU(s) 432 should execute at a certain time. For example, scheduler 422 may determine that it is time to de-schedule a currently running VCPU from execution, and may, before de-scheduling the VCPU, read register(s) 418 (e.g., the HOLD_LOCK register) to determine whether the VCPU that is currently running holds a lock. If it is determined that the currently running VCPU does not hold the lock, scheduler 422 may de-schedule the currently running VCPU from execution and schedule another VCPU to execute. If it is determined that the currently running VCPU holds the lock, scheduler 422 may allow the currently running VCPU to execute for up to a specified time period before de-scheduling the currently running VCPU.

In some embodiments, hypervisor 420 may allow the currently running VCPU that holds the lock to run a few extra cycles or an extra time period until the VCPU releases the lock. For example, in some implementations, hypervisor 420 may configure the HOLD_LOCK_TRIGGER register, which may enable trigger circuit 424. Once the currently running VCPU releases the lock and the HOLD_LOCK register is cleared, trigger circuit 424 may trigger a hypervisor level exception (interruption), such that the hypervisor may de-schedule the currently running VCPU right after the VCPU releases the lock. Hypervisor 420 may also enable timer circuit 426 by, for example, configuring the HOLD_LOCK_TIMER register. Timer circuit 426, when enabled, may start to count down from a specified value once a non-zero value indicating that the currently running VCPU is holding the lock is written to the HOLD_LOCK register, as described above. When timer circuit 426 counts to zero, it may clear the HOLD_LOCK register. Hypervisor 420 may also enable interrupt mask circuit 428, which may mask some or all hypervisor interrupts occurred during the time period when the HOLD_LOCK register holds the non-zero value. The masked hypervisor interrupts occurred during the time period when the HOLD_LOCK register holds the non-zero value may be performed after a zero is written to the HOLD_LOCK register, for example, by the currently running VCPU after the currently running VCPU releases the lock, or by the timer circuit after the timer circuit counts to zero.

In some embodiments, some or all of the functions described above may be implemented using software code. In some embodiments, some or all of the functions described above may be implemented in hardware, software, firmware, middleware, microcode, hardware description languages, or any combination thereof. In example embodiments described below, at least some portions of the functions described above may be implemented by one or more hardware circuits of the virtualized system.

Figure 5:
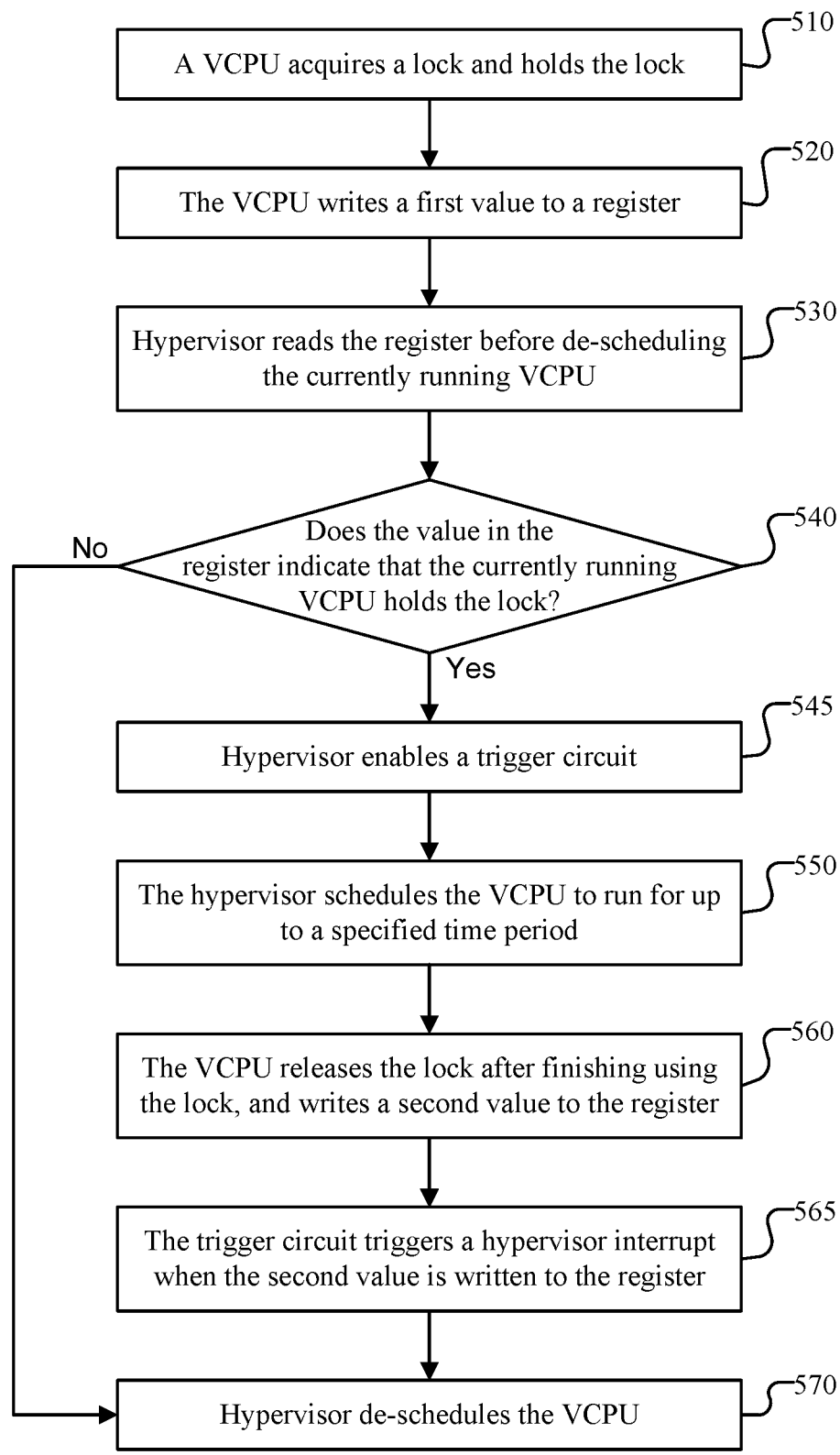
FIG. 5 is a simplified flow chart illustrating an example method of handling spinlocks in a virtualized computer system, according to certain aspects of the present disclosure.

FIG. 5 is a simplified flow chart 500 illustrating an example method of handling spinlocks in a virtualized system, according to certain aspects of the present disclosure. Blocks 510, 520, 530, 540, 550, and 570 may be similar to blocks 310, 320, 330, 340, 350, and 370 described above with respect to FIG. 3, respectively.

At block 545, after it is determined at block 540 that the value in the register indicates that the currently running VCPU holds the lock, a hypervisor may enable a trigger circuit (e.g., trigger circuit 424 of FIG. 4) by, for example, configuring a register (e.g., HOLD_LOCK_TRIGGER register described above). The hypervisor may then schedule the currently running VCPU to run for up to a specified extra time period at block 550.

At block 560, the currently running VCPU may run for the specified extra time period. In some cases, the currently running VCPU may be able to finish the critical section while holding the lock within the extra time period, and release the lock. After releasing the lock, the currently running VCPU may write a second value (e.g., a zero) to the register (e.g., the HOLD_LOCK register).

At block 565, the trigger circuit may triggers a hypervisor interrupt after the second value is written to the register. For example, the trigger circuit may call the hypervisor to de-schedule the currently running VCPU and schedule another VCPU to run on a virtual machine at block 570.

Figure 6:
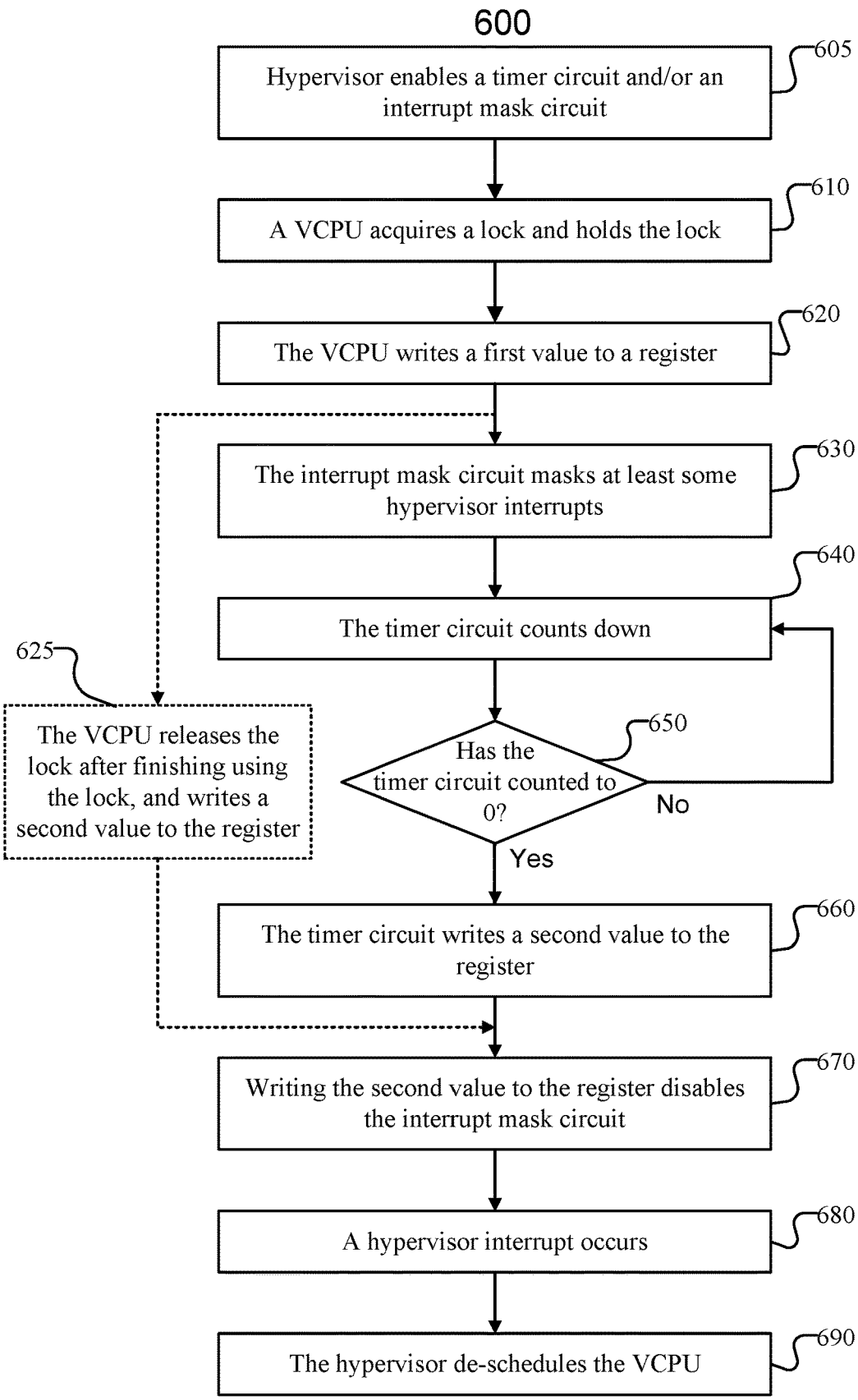
FIG. 6 is a simplified flow chart illustrating an example method of handling spinlocks in a virtualized computer system, according to certain aspects of the present disclosure.

FIG. 6 is a simplified flow chart 600 illustrating an example method of handling spinlocks in a virtualized system, according to certain aspects of the present disclosure. At block 605, a hypervisor may enable a timer circuit (e.g., timer circuit 426 of FIG. 4) and/or an interrupt mask circuit (e.g., interrupt mask circuit 428) by, for example, configuring the HOLD_LOCK_TIMER register and/or the HOLD_LOCK_MASK register described above. Blocks 610 and 620 may be similar to blocks 310 and 320 described above with respect to FIG. 3, respectively.

At block 630, after the currently running VCPU writes a first value (e.g., a non-zero value) to a register (e.g., the HOLD_LOCK register) when the currently running VCPU acquires a lock, the interrupt mask circuit may mask some or all attempted hypervisor interrupts (e.g., a hypervisor timer interrupt), such that the VCPU holding the lock may continue to run without interruptions by the hypervisor. In some implementations, at least some interrupts, such as a voltage drop detection interrupt, may not be masked by the interrupt mask circuit.

At block 640, after the currently running VCPU writes the first value (e.g., a non-zero value) to the register (e.g., the HOLD_LOCK register) when the currently running VCPU acquires the lock, the timer circuit may start to count down from a specified counter value, while the lock-holding VCPU continues to run. The counter value may be determined based on the maximum time that a VCPU may be allowed to hold a lock. The counter value may be set when the timer circuit is reset. It is noted that the operations at blocks 630 and 640 may be performed in parallel, and at any time after the first value is written to the register and before the timer circuit counts to zero.

At block 650, the timer circuit may determine whether the counter value has reached zero. If the counter value is not zero yet, the timer circuit may continue to count down at block 640. If the counter value has reached zero, flow chart 600 may proceed to block 660, where the timer circuit or another circuit may clear the HOLD_LOCK register by writing a second value (e.g., a zero) to the HOLD_LOCK register.

As described above, while the timer circuit is counting down, the lock-holding VCPU may continue to run. In some cases, the lock-holding VCPU may finish using the critical resource and release the lock before the timer circuit counts to zero. In such cases, as shown in block 625, the currently running VCPU may optionally write the second value to the HOLD_LOCK register to indicate that it is not holding the lock.

At block 670, when the second value is written to the HOLD_LOCK register either by the timer circuit as described with respect to block 660 or by the currently running VCPU as described with respect to block 625, the interrupt mask circuit may be disabled, and hypervisor interrupts occurred during the time period when the interrupt mask circuit is enabled may be performed.

At block 680, a hypervisor interrupt may occur after the interrupt mask circuit is disabled. The hypervisor interrupt may cause the currently running VCPU to stop executing and the hypervisor to be called.

At block 690, the hypervisor may be called to respond to an interrupt, such as one that has been masked previously. For example, the hypervisor may de-schedule the currently running VCPU and schedule another VCPU to run on the same virtual machine, as described above with respect to block 370 of FIG. 3.

Even though FIGS. 5 and 6 describe example methods as sequential operations, some of the operations may be performed in parallel or concurrently. Some of the operations may be performed in different order. For example, operations in blocks 510 and 520 (or blocks 610 and 620) may be performed in different orders. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

Even though the embodiments described above do not take into account more complex scenarios, such as multiple lock-holdings, a person skilled in the relevant art may appreciate that similar techniques as described above may be used in such more complex scenarios.

Further, some of the techniques described above may be used in a virtualized system that uses fair spinlocks, where VCPUs waiting for spin-locks are assigned sequence numbers and will acquire the spinlocks in the order of their assigned sequence numbers. In a virtualized system using fair spinlocks, it may be difficult to determine which VCPU should be executed next. In some embodiments, with the use of the techniques disclosed hereinabove, a virtualized system may perform better without using the fair spinlocks. In some embodiments, the WAIT_LOCK register described above may be used such that the hypervisor may know which VCPU is spinning on a lock with a specific lock tag (address). In some embodiments, information regarding the order of lock acquiring by the VCPUs may be added to registers, such as the HOLD_LOCK register, such that the hypervisor may schedule the VCPUs accordingly.

Figure 7:
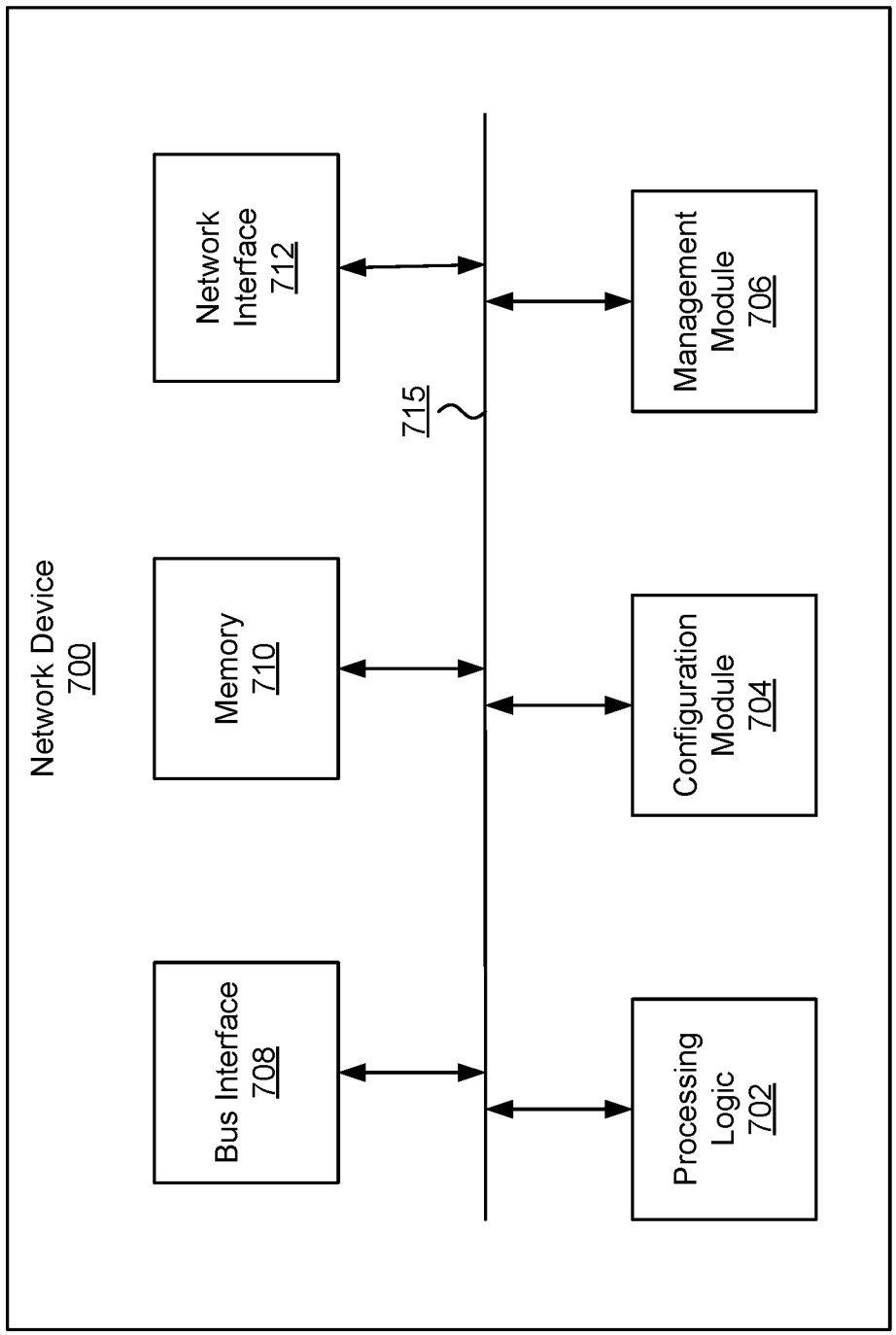
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc. The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
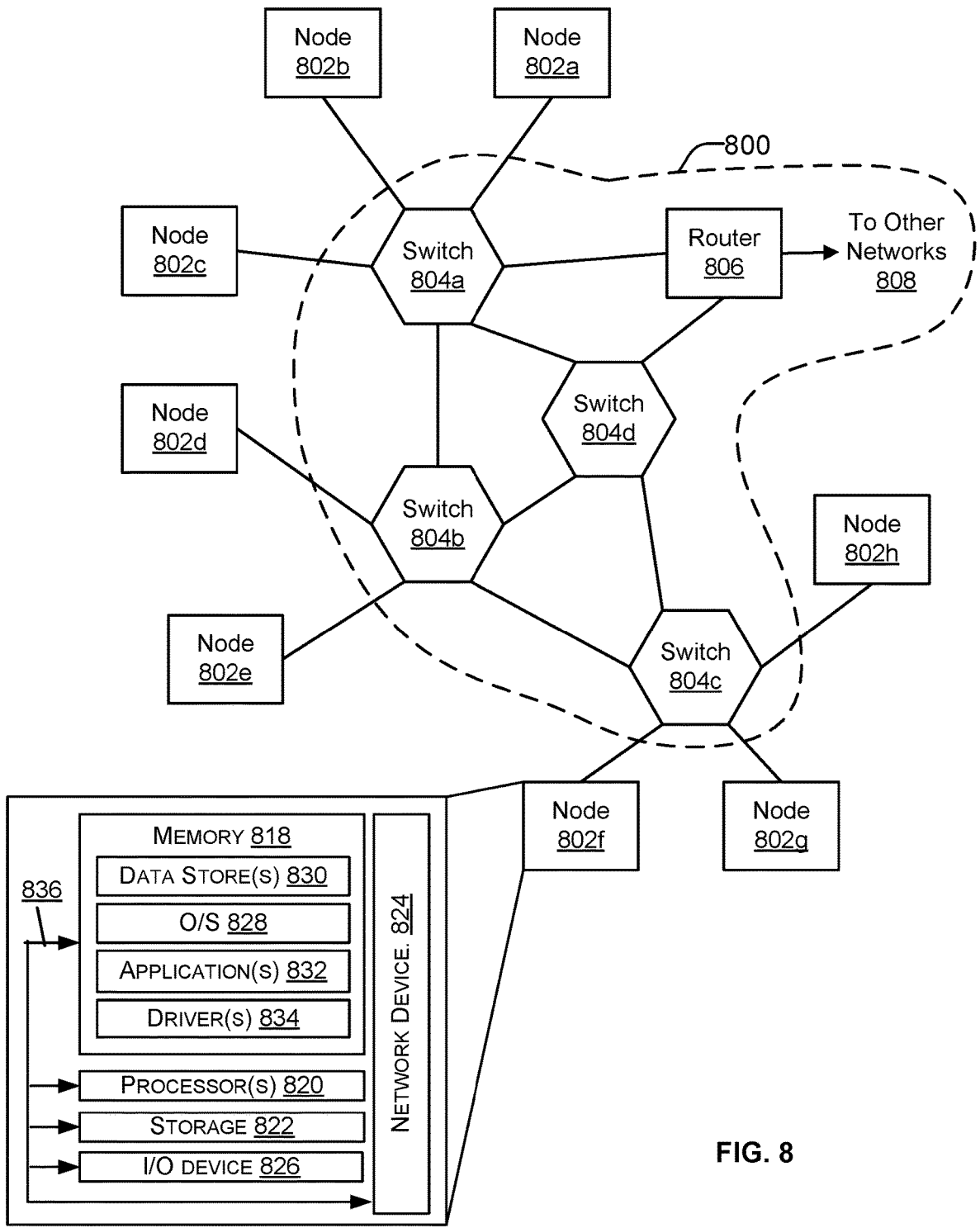
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions or virtual functions. Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
  writing a first value to a first register to enable an interrupt mask circuit;
  acquiring, by a currently running virtual central processing unit (CPU), a lock for an exclusive use of a specified resource;
  writing, by the currently running virtual CPU, a second value to a second register, the second value explicitly indicating to a hypervisor that the currently running virtual CPU is holding the lock for the exclusive use of the specified resource;
  masking, by the interrupt mask circuit, an attempted hypervisor interrupt that occurred when the first register holds the first value and the second register holds the second value;
  reading, by the hypervisor before de-scheduling the currently running virtual CPU, a value in the second register; and
  in response to determining that the value read from the second register is the second value explicitly indicating that the currently running virtual CPU is holding the lock for the exclusive use of the specified resource, scheduling, by the hypervisor, the currently running virtual CPU to run for up to a specified time period before de-scheduling the currently running virtual CPU, wherein the second register stores only one bit.

2. The computer-implemented method of claim 1, further comprising:

enabling, by the hypervisor, a trigger circuit that is configured to, after a third value is written to the second register by the currently running virtual CPU, trigger the hypervisor to de-schedule the currently running virtual CPU, the third value in the second register explicitly indicating to the hypervisor that the currently running virtual CPU is not holding the lock for the exclusive use of the specified resource.

3. The computer-implemented method of claim 1, wherein:
acquiring the lock for the exclusive use of the specified resource by the currently running virtual CPU comprises writing a third value to a third register to indicate a wait for the lock for the exclusive use of the specified resource; and
the computer-implemented method further comprises writing a fourth value to the third register after the currently running virtual CPU acquires the lock.

4. A computer-implemented method, comprising:
writing a first value to a first register to enable an interrupt mask circuit;
acquiring, by an executing virtual central processing unit (CPU), a lock for an exclusive use of a specified resource;
providing, by the executing virtual CPU, an explicit indication to a hypervisor that the executing virtual CPU is holding the lock for the exclusive use of the specified resource by writing a second value to a second register before or after the executing virtual CPU acquires the lock for the exclusive use of the specified resource;
masking, by the interrupt mask circuit, an attempted hypervisor interrupt that occurred when the first register holds the first value and the second register holds the second value;
determining, by the hypervisor, that the executing virtual CPU is holding the lock for the exclusive use of the specified resource, wherein determining that the executing virtual CPU is holding the lock for the exclusive use of the specified resource is based on the explicit indication written by the executing virtual CPU; and
scheduling the executing virtual CPU to run for up to a first time period before de-scheduling the executing virtual CPU.

5. The computer-implemented method of claim 4, further comprising:
writing, by the executing virtual CPU, a third value to the second register after the executing virtual CPU releases the lock for the exclusive use of the specified resource or fails to acquire the lock for the exclusive use of the specified resource, the third value in the second register explicitly indicating to the hypervisor that the executing virtual CPU is not holding the lock for the exclusive use of the specified resource.

6. The computer-implemented method of claim 4, further comprising:
providing, by the executing virtual CPU, an explicit indication to the hypervisor that the executing virtual CPU is not holding the lock for the exclusive use of the specified resource; and
de-scheduling, by the hypervisor in response to the explicit indication that the executing virtual CPU is not holding the lock for the exclusive use of the specified resource, the executing virtual CPU.

7. The computer-implemented method of claim 4, wherein the explicit indication to the hypervisor that the executing virtual CPU is holding the lock for the exclusive use of the specified resource is invalid after a second time period has passed since the executing virtual CPU provided the explicit indication.

8. The computer-implemented method of claim 4, further comprising:
enabling, by the hypervisor, a timer circuit;
counting down from a specified counter value by the timer circuit after the executing virtual CPU writes the second value to the second register to explicitly indicate to the hypervisor that the executing virtual CPU is holding the lock for the exclusive use of the specified resource; and
writing, by the timer circuit, a third value to the second register after the timer circuit counts to zero, the third value in the second register explicitly indicating to the hypervisor that the executing virtual CPU is not holding the lock for the exclusive use of the specified resource.

9. The computer-implemented method of claim 8, wherein:
after the timer circuit starts to count and before the timer circuit counts to zero, the timer circuit continues to count down unless the third value is written to the second register.

10. The computer-implemented method of claim 8, further comprising:
resetting the timer circuit after the third value is written to the second register by the timer circuit or by the executing virtual CPU.

11. The computer-implemented method of claim 4, further comprising:
writing, by a second virtual CPU waiting for the lock, a third value to a third register, the third value in the third register indicating that the second virtual CPU is waiting for the lock for the exclusive use of the specified resource.

12. The computer-implemented method of claim 11, wherein the third register further comprises information identifying the lock that the second virtual CPU is waiting for.

13. The computer-implemented method of claim 4, wherein acquiring the lock for the exclusive use of the specified resource by the executing virtual CPU comprises writing a third value to a third register to indicate a wait for the lock for the exclusive use of the specified resource.

14. The computer-implemented method of claim 4, wherein the second register stores only one bit.

15. A system, comprising:
a processor;
an interrupt mask circuit in the processor;
a first register in the processor, the first register being writable with a first value to enable the interrupt mask circuit;
a second register in the processor, the second register being writable with a second value by an executing virtual central processing unit (CPU) before or after the executing virtual CPU acquires a lock to a specified resource, the second value explicitly indicating that the executing virtual CPU holds the lock for an exclusive use of the specified resource, wherein the interrupt mask circuit is configured to mask an attempted hypervisor interrupt that occurred when the first register holds the first value and the second register holds the second value; and
a hypervisor executing on the processor, the hypervisor configured to, in response to a determination based on reading the second value written in the second register explicitly indicating to the hypervisor that the executing virtual CPU is holding the lock for the exclusive use of the specified resource, schedule the executing virtual CPU to run for up to a first time period before de-scheduling the exclusive use of the specified resource by the executing virtual CPU.

16. The system of claim 15, wherein:
the second register is writable by the executing virtual CPU with a third value that, when written in the second register, explicitly indicates to the hypervisor that the executing virtual CPU is not holding the lock for the exclusive use of the specified resource.

17. The system of claim 16, further comprising:
a triggering circuit in the processor, wherein the triggering circuit is configured to, after the third value is written to the second register, trigger the hypervisor to de-schedule the executing virtual CPU.

18. The system of claim 16, further comprising a timer circuit in the processor, wherein the timer circuit is configured to:
count down from a specified counter value after the executing virtual CPU writes the second value in the second register; and
write the third value in the second register explicitly indicating to the hypervisor that the executing virtual CPU is not holding the lock for the exclusive use of the specified resource after the timer circuit counts to zero.

19. The system of claim 15, wherein the hypervisor is configured to determine that the executing virtual CPU is holding the lock for the exclusive use of the specified resource in response to reading the second value written in the second register.

20. The system of claim 15, wherein the second register stores only one bit.

* * * * *